Registered May 5, 1925.

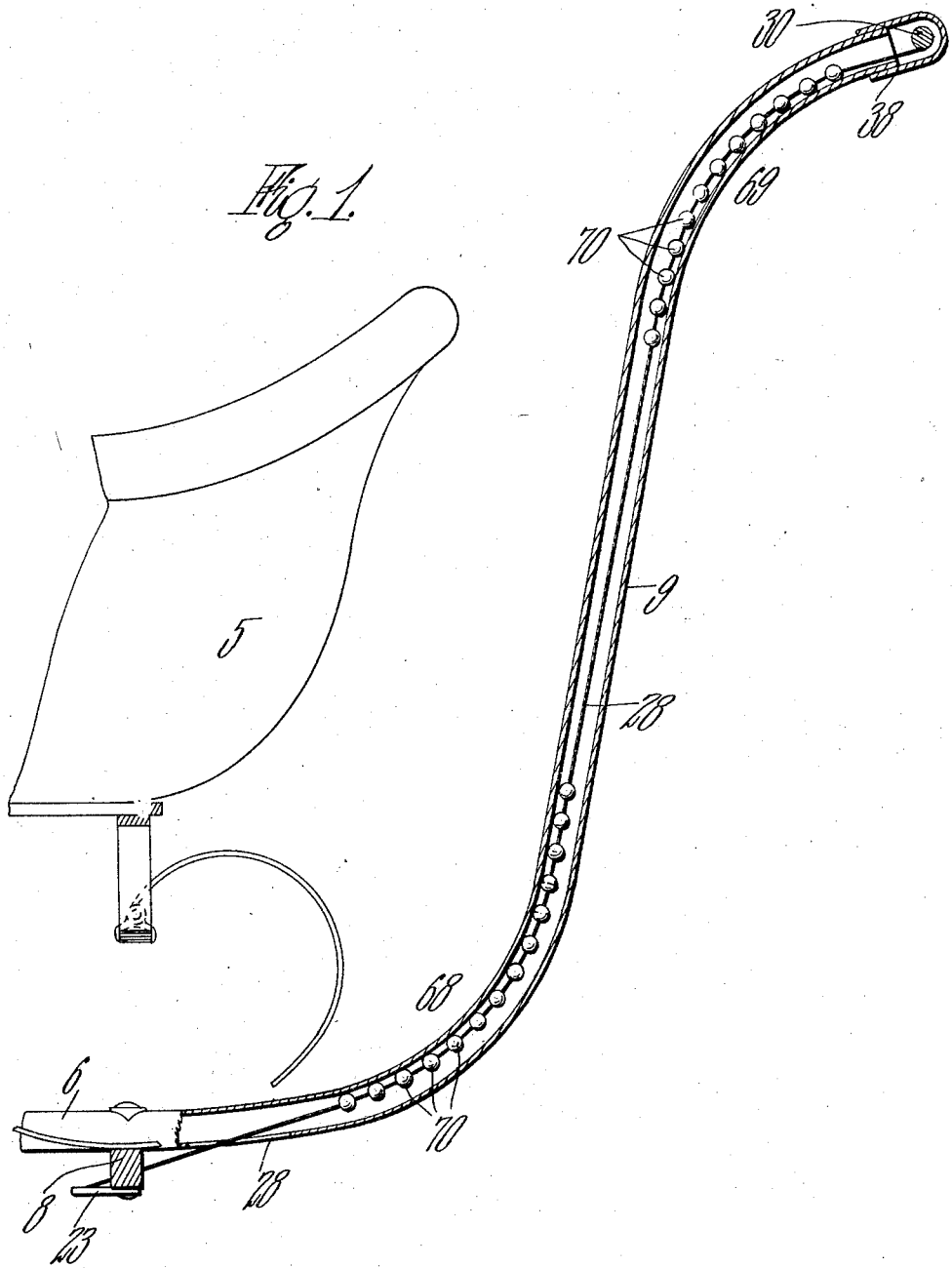

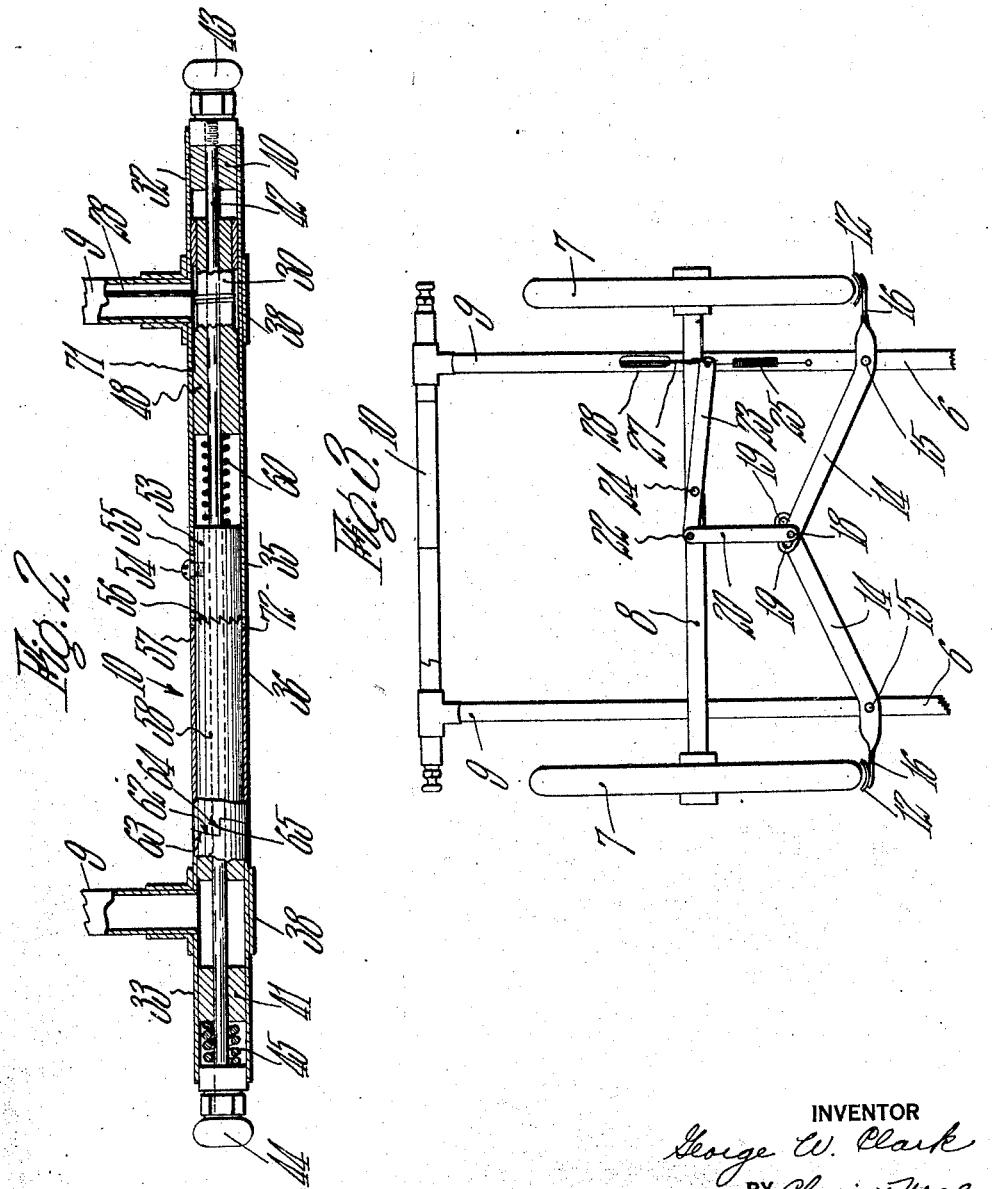

1,536,285

UNITED STATES PATENT OFFICE.

GEORGE W. CLARK, OF WESTFIELD, MASSACHUSETTS, ASSIGNOR TO WESTFIELD MANUFACTURING COMPANY, A CORPORATION OF MASSACHUSETTS.

BRAKE MECHANISM FOR BABY CARRIAGES.

Application filed April 19, 1922. Serial No. 555,538.

*To all whom it may concern:*

Be it known that I, GEORGE W. CLARK, citizen of the United States, residing at Westfield, in the county of Hampden and State of Massachusetts, have invented new and useful Improvements in Brake Mechanism for Baby Carriages, of which the following is a specification.

The present invention relates to improvements in brake mechanism for baby carriages.

In the present construction, the brakes are adapted to be operated by means including a flexible cable which extends upwardly through one of the tubular handle-bar supporting members of a baby carriage, said cable being secured at its lower end to a brake-actuating lever and at its upper end to a manually operable element associated with the handle-bar for pulling or releasing the brake cable. Inasmuch as the tubular handle-bar supporting members are commonly curved longitudinally adjacent both their upper and lower extremities, the cable unless properly protected would rub frictionally across the inner walls of said tubular members, at the curved portions thereof, when the cable is pulled or released to operate the brakes.

To prevent such a possible rubbing contact between the brake cable and the interior of the tubular handle-bar supporting member through which said cable extends, and thus to protect the cable from wear and to facilitate the operations of applying and releasing the brakes, the present invention contemplates certain improved features of construction which will hereinafter be described and claimed.

With respect to certain other subject matter herein illustrated and described, the present application is a continuation in part of a copending application Serial No. 491,830, filed August 12, 1921, by the present inventor.

The various features of the invention will best be understood from a description of the preferred embodiment thereof illustrated in the accompanying drawings, in which:—

Fig. 1 is a fragmentary view, partially in side elevation and partially in section, of the rear portion of a baby carriage, showing particularly the brake cable which extends through one of the tubular handle-bar supporting members;

Fig. 2 is a longitudinal sectional view of the handle-bar; and

Fig. 3 is an inverted plan view of a portion of the frame for supporting the carriage body, the view showing also the rear wheels, the brakes and parts of the brake-actuating mechanism.

Referring to Figs. 1 and 3 of the drawings, the body of a baby carriage is indicated at 5, the usual tubular side frame members at 6, the rear wheels at 7, and their axle at 8. The rear axle 8 and the front axle (not shown) are rigidly secured to the side frame members 6 and together therewith constitute a rectangular frame for supporting the carriage body. The side frame member 6 are extended at the rear, as is customary in baby carriage construction, to provide tubular handle-bar supporting members 9 which curve rearwardly and upwardly from the rear axle 8 as shown in Fig. 1. At their upper extremities, the tubular members 9 are connected by a horizontal handle bar 10.

The rear wheels 7 are adapted to be engaged by brake shoes 12 (Fig. 3) which may be curved transversely, as shown, to conform to the transverse curvature of the tires or peripheries of the wheels. The brake shoes 12 are rigidly secured to the outer ends of a pair of transverse levers 14 which are severally pivoted for horizontal oscillation about studs 15 which project downwardly from the lower sides of the frame members 6. Each lever 14 consists of a flat bar which lies in a horizontal plane for the greater part of the length but at its outer end is twisted into a vertical plane, as shown a 16, for attachment to the brake shoe. It will be seen that the levers 14 are arranged with their wide flat sides at right angles to their axes of oscillation, so that they will rock in edgewise directions, thereby rendering the levers unyielding to the strains to which they are subjected and insuring that they will not be bent in use. The inwardly extending portions of the levers are disposed at a slight angle to the outwardly extending portions 16 to enable them to approach more closely the rear axle 8 and the inner extremities of said levers overlap, as indicated in Fig. 3. The levers 14 are connected to oscillate in unison by means of a pivot stud 18 which extends through longitudinal slots 19 in the levers and serves also to connect the two levers to the forward end of a link 20. The rear end of the link 20 is pivotally connected at 22 to the inner end of an actuating lever 23, the latter being fulcrumed at 24 upon the lower side of the rear axle 8. The lever 23 is acted upon by a coiled tension spring 25 which is secured at one end to the outer extremity of said lever and at its opposite end to the adjacent side frame member 6. The force of the spring 25 normally maintains the parts just described in the positions in which they appear in Fig. 3 so that the brake shoes are yieldingly held out of engagement with the wheels.

To enable the brakes to be conveniently applied at will, the actuating lever 23 has secured to its outer end an operating cable 27 which extends from said lever through a longitudinal slot 28 in the lower side of the adjacent tubular handle-bar supporting member 9, and upwardly through the interior of said tubular member to a winding drum 30 that constitutes a portion of the handle bar 10, the cable being securely fastened to said drum so that it may be wound up thereon for the purpose of applying the brakes or unwound therefrom to effect the release of the brakes.

In order that the winding drum 30 may be conveniently rotated to operate the brakes, the handle-bar 10 is constructed as will now be described. As shown in Fig. 2, the handle-bar 10 comprises two fixed tubular sections 32 and 33 that are carried by the handle-bar supporting members 9, and two rotatable sleeves 35 and 36 which are arranged to abut end-to-end at the joint 72 and are interposed between the fixed handle-bar sections 32 and 33 so as to abut the same at the joints 71, and 63 respectively. The fixed handle-bar sections 32 and 33 are rigidly secured within transverse tubular socket members or T's 38 into which project the upper extremities of the tubular handle-bar supporting members, 9. Rigidly secured within the tubular handle-bar section 32 is a bushing 40, while a similar bushing 41 is fixed within the tubular handle-bar section 33. Extending loosely through the fixed bushings 40 and 41 are the opposite end portions of a horizontal tie-rod 42. Threaded upon the opposite ends of the tie-rod 42 are two nuts 43 and 44. The nut 43 bears against the outer end of the bushing 40 while the nut 44 bears against a coiled spring 45 which surrounds the tie-rod and is interposed between the nut 44 and the outer end of the bushing 41. The tie-rod 42 serves to hold together the several sections of the handle while the spring 45 permits the upwardly curved extremities of the handle-bar supporting members 9 to be sprung apart slightly for the purpose of releasing the brakes as will be hereinafter explained.

The application of the brakes is effected by turning the rotatable handle section 35 while the brakes are released by turning the handle section 36. Accordingly, for convenience of description, the handle sections 35 and 36 will hereinafter be referred to as the brake-applying sleeve 35 and the brake-releasing sleeve 36 respectively. To effect the application of the brakes, the brake-applying sleeve 35 is rigidly secured to a hollow spindle 48 which, in turn, fits loosely upon the tie-rod 42. The spindle 48 has a reduced portion which projects into the inner portion of the tubular handle section 32 and constitutes the winding drum or reel 30 to which the upper end of the cable 28 is affixed.

For the purpose of maintaining the brakes in holding engagement with the carriage wheels, means is provided for preventing reverse rotation of the winding spindle 48. To this end, a slidable bushing 53 surrounds the tie-rod 42, within the brake-applying sleeve 35. The slidable bushing 53 is constrained to rotate with the brake-applying sleeve 35 by means of a screw 54 which is threaded into said bushing and extends through a longitudinal slot 55 in said sleeve. The bushing 53 is provided at one end with ratchet teeth 56 which cooperatively engage complemental ratchet teeth 57, the latter being formed at one end of a bushing 58 which extends loosely through the brake-releasing sleeve 36 and is rigidly secured at its opposite end within the fixed handle-bar section 33.

Normally, the ratchet teeth 56 and 57 are maintained cooperatively engaged by means of a coiled spring 60 which surrounds the tie-rod 42, and bears at one end against the inner end face of the spindle 48 and at the other end against the outer end face of the slidable ratchet bearing 53. With this construction, as the brake-applying sleeve 35 is turned away from the operator, the ratchet teeth 56 will ride idly over the complemental teeth 57 and the cable 28 will be wound up on the drum 30. Thus the brakes will be applied with a degree of pressure depending upon the amount of rotation of the sleeve 35. It will be seen that the brakes may thus be applied with varying degrees of pressure. Such control of braking pressure is very desirable, for example, for the purpose of slowing up the movement of the carriage on down grades without completely arresting it. When the sleeve 35 is released, the inter-engagement of the ratchet teeth 56 and 57 causes the brakes to be held against the wheels of the carriage.

To effect the release of the brakes, the non-rotatable bushing 58 is moved bodily in a longitudinal direction to disengage the ratchet teeth 57 from the ratchet teeth 56. This movement of the bushing 58 is effected by springing the adjacent handle-bar supporting member 9 outwardly against the action of the coiled spring 45 and this springing of the member 9 is, in turn, effected by the rotation of the brake-releasing sleeve 36. To this end, the sleeve 36 is provided with a spiral cam face 62 which abuts and coacts with a corresponding spiral cam face 63 that is formed at the adjacent end of the fixed handle section 33. When it is desired to release the brakes, the brake-releasing sleeve 36 is turned away from the operator, causing the cam face 62 to ride over the cam face 63. The resulting cam action forces the handle-bar supporting member 9 toward the left, carrying with it the non-rotatable bushing 58 so that the teeth 57 on the latter will be disengaged from the teeth 66 on the ratchet bushing 53. Thus the cable 28 will be permitted to unwind from the spindle 58 and the action of the spring 25 will cause the brakes to be released. The spiral cam faces 62 and 63 are provided with cooperating shoulders 64 and 65 which are formed between the highest and lowest points of the respective cam faces. Also the construction and arrangement is such that the ratchet teeth 56 and 57 will be disengaged, by turning of the brake-releasing sleeve 36, before the shoulders 64 and 65 are brought opposite each other. Accordingly after brakes have been released the turning of the brake-releasing sleeve 36 should be continued until the high point of its cam face 62 passes the high point of the cam face 63 of the handle section 33. Thereupon the parts will be restored to their normal positions by the inward springing tendency of the outwardly displaced handle-bar supporting member 9 aided by the action of the coiled spring 45. If desired, the cam faces 62 and 63 may be constructed with sufficient pitch to insure that the brake-releasing sleeve will be restored to its normal lateral position by the spring action of the handle-bar supporting members and spring 45 whenever the sleeve 36 is released.

Referring to Fig. 1 it will be seen that the tubular handle-bar supporting member 9, there shown, is formed with two longitudinally curved sections 68 and 69 adjacent the lower and upper extremities respectively, of said member, this being the form ordinarily employed in baby-carriage construction. It is obvious, therefore, that the brake cable 28, when pulled or released to operate the brakes, will necessarily rub across the interior of the handle-bar supporting member at two different portions thereof, namely, along the inner face at the upper side of the lower curved section 68 and along the inner face at the lower side of the upper curved section 69.

To prevent this rubbing of the brake cable upon the inside of the handle-bar supporting member and thus to avoid the resulting wear upon the cable which tends to weaken the same, the present invention contemplates the provision, upon the cable, of friction reducing means for engaging the inside of the handle-bar supporting member for protecting the brake cable from wearing friction. This friction-reducing means comprises a plurality of steel balls 70 through which the cable extends, the balls being preferably secured rigidly to the cable in spaced-apart relation, substantially as shown in Fig. 1. The balls may be secured upon the cable in any suitable manner as by soldering or crimping operations. With this construction it is obvious that the cable itself will not be permitted to come into rubbing contact with the inside of the tubular supporting member through which it extends. The smoothly rounded surfaces of the balls afford a succession of point bearings against the inside of the tubular member 9 so that friction is reduced to a minimum when the brake cable is actuated. Preferably the friction balls 70 are provided upon the brake cable only along the two stretches thereof which extend through the curved portions 68 and 69 of the tubular member 9 and which would otherwise be in contact with the inside wall of these portions of said member. Sufficient space is provided between the uppermost ball 70 and the winding drum 30 to insure against interference by the balls with the free winding up of the brake cable upon the winding drum.

By reason of the fact that the brake cable is to be wound upon a winding drum of small diameter the cable must be very flexible. For this reason a cable of stranded wire construction is preferably employed. It has been found, in practice, that with an unprotected cable of this character, the rubbing of the cable along the inner surface of the handle-bar supporting member wears out the fine strands of cable wire one at a time until finally the cable breaks or becomes weakened so as to render the mechanism unreliable. The use of the friction balls 70, as above described effectively protects the cable from wear without rendering it any less flexible. Furthermore the use of the balls greatly facilitates the operation of applying or releasing the brakes by eliminating to a very large extent the frictional resistance to the pulling or releasing of the brake cable. It is pointed out that the slot 28 through which the lower end of the brake cable extends is so arranged that contact between the cable and the edges of the slot is avoided. Furthermore the upper end of the brake cable is attached to the winding drum 30 at such a point on the latter as to insure that the cable will not be permitted to engage either side of the upper end of the tubular member 9. By telescoping the upper ends of the handle-bar supporting members 9 within the T-joints 38 and bringing said ends substantially flush with the inside surface of the sleeve 32, smooth inner surfaces are insured with the T joints having no sharp edges or projecting portions which might wear or cut the cable.

Various modifications of the specific constructions and arrangements of parts herein shown and described may be made without departing from the spirit of the invention. The scope of the invention should therefore be determined from the following claims rather than from the preceding description.

The invention having been described, what is claimed is,—

1. In a baby carriage the combination of a frame for supporting the carriage body, a brake and actuating mechanism therefor, a handle-bar, a tubular handle-bar supporting member, a cable connected at one end to the brake-actuating mechanism and extending through said tubular member, means associated with the handle-bar for pulling said cable to actuate the brake, and friction reducing devices carried by said cable to protect the latter from wear.

2. In a baby carriage the combination of a frame for supporting the carriage body, a brake actuating mechanism therefor, a handle bar having a rotatable portion, a tubular handle-bar supporting member, a cable extending through said tubular member, said cable being connected at one end to the brake-actuating mechanism and at the opposite end to the rotatable portion of the handle-bar and adapted to be wound upon the latter to actuate the brake, and friction reducing devices carried by said cable to protect the latter from wear.

3. In a baby-carriage, the combination of a frame for supporting the carriage body, a brake and actuating mechanism therefor, a handle-bar, tubular handle-bar supporting members curving upwardly and rearwardly from the rear of said supporting frame, a cable connected at one end with said brake-actuating mechanism and extending upwardly through one of said tubular members, means associated with said handle bar for pulling said cable to actuate the brake, and a plurality of balls carried by said cable to eliminate rubbing contact between the cable and the walls of said tubular member.

4. In a baby carriage the combination of a frame for supporting the carriage body, a brake and actuating mechanism therefor, a handle-bar, tubular handle-bar supporting members rising from the rear of said supporting frame and having curved portions adjacent their upper and lower extremities, a cable connected at one end with said brake-actuating mechanism and extending upwardly through one of said tubular members, the sections of the cable which extend through said curved portions of the tubular member having a plurality of balls rigidly secured thereon to hold the cable out of frictional contact with the curved walls of the tubular member, and means associated with said handle-bar for pulling said cable to actuate the brake.

5. In a baby carriage the combination of a frame for supporting the carriage body, a brake and actuating mechanism therefor, a handle-bar, tubular handle-bar supporting members rising from the rear of said supporting frame and having curved portions adjacent their upper and lower extremities, the lower of said portions extending rearwardly and upwardly from said lower extremities and the upper of said portions extending forwardly and downwardly from said upper extremities, a cable connected at one end with said brake-actuating mechanism and extending upwardly through one of said tubular members, means associated with said handle bar for pulling said cable to actuate the brake, and a plurality of friction balls rigidly secured in spaced-apart relation upon those sections of said cable which extend through said curved portions thereof to protect the cable from rubbing contact with the wall of said tubular member and to facilitate the pulling of the cable.

6. In a baby carriage the combination of a frame for supporting the carriage body, a brake and actuating mechanism therefor, a handle-bar, tubular handle-bar supporting members rising from the rear of said supporting frame and having curved portions adjacent their upper and lower extremities, the lower of said portions extending rearwardly and upwardly free from said lower extremities and having an aperture in its wall at the lower side thereof and the upper of said portions extending forwardly and downwardly from said upper extremities, a cable connected at one end with said brake-actuating mechanism and extending upwardly through said aperture and through the interior of the apertured member, and a plurality of friction balls rigidly secured in spaced-apart relation upon those sections of said cable which extend through said curved portions thereof to protect the cable from rubbing contact with the wall of said tubular member and to facilitate the pulling of the cable.

7. In a baby carriage, the combination of a frame for supporting the carriage body, a brake and actuating mechanism therefor, a hollow handle-bar, a tubular handle-bar supporting member extending between said handle bar and said frame, a cable connected at one end to the brake-actuating mechanism and extending through said tubular member, and means carried within said handle-bar for pulling said cable to actuate the brake.

8. In a baby-carriage, the combination of a frame for supporting the carriage body, a brake and actuating mechanism therefor, a hollow handle-bar having a rotatable portion, a tubular handle-bar supporting member extending between said handle bar and said frame, a cable extending through said tubular member, said cable being connected at one end to the brake-actuating mechanism and at the opposite end to the rotatable portion of the handle-bar and adapted to be wound by the latter to actuate the brake, and means for holding said rotatable member to prevent unwinding of the cable therefrom.

9. In a baby-carriage, the combination of a frame for supporting the carriage body, a brake and actuating mechanism therefor, a hollow handle-bar having a rotatable portion, a tubular handle-bar supporting member extending between said handle bar and said frame, a cable extending through said tubular member, said cable being connected at one end to the brake-actuating mechanism and at the opposite end to the rotatable portion of the handle-bar and adapted to be wound by the latter to actuate the brake, means for holding said rotatable member to prevent unwinding of the cable therefrom, and means for releasing said holding means.

10. In a baby-carriage, the combination of brake gearing, an operating cable connected with said gearing, a pair of spaced-apart handle supports, and a handle carried by said supports and connected with said cable for controlling the action of the brake gearing, said handle comprising a rotatable brake-applying sleeve, a spindle fixed to said sleeve the spindle being journaled in one of said handle supports and having said cable attached thereto to enable it to be wound thereon when the spindle is rotated, a longitudinally slidable member rotatable with the brake-applying sleeve, cooperating ratchet teeth carried by said slidable member and by the other handle support for preventing rotation of said spindle, means for yieldingly maintaining said teeth and holding means in engagement to prevent unwinding of the cable from the spindle, and means for disengaging said ratchet teeth and holding means to release the spindle.

11. In a baby-carriage, the combination of brake mechanism, an operating cable connected with said mechanism, a pair of spaced-apart handle-bar supports, a handle carried by said supports and connected with said cable for controlling the action of the brake mechanism, said handle comprising a rotatable brake-applying sleeve, a hollow spindle fixed to said sleeve, said spindle being journaled in one of said handle-bar supports and having said cable attached thereto to enable it to be wound thereon when the spindle is rotated, a brake-releasing sleeve, a bushing fixed to the other handle-bar support upon which said brake-releasing sleeve is journaled, a longitudinally slidable bushing rotatable with said brake-applying sleeve, cooperating ratchet teeth on said sleeves, means for yieldingly holding said teeth interengaged to prevent unwinding of the cable from the spindle, a cam face on said brake-releasing sleeve engageable with a portion of the last mentioned handle-bar support to spring apart said handle-bar supports and retract the fixed bushing from the rotatable bushing to disengage the ratchet teeth and release said spindle, and a tie-rod extending through said bushings, spindle and handle-bar supports for holding together the parts of the handle.

12. In a baby-carriage, the combination with the wheels and the carriage body, of brakes for engaging the wheels, brake-actuating mechanism, a handle for propelling the carriage, said handle comprising two independently rotatable portions one for controlling the application of the brakes and the other for controlling the release of the brakes, and operative connections between said rotatable handle portions and the brake-actuating mechanism.

13. In a baby-carriage, the combination with the wheels and the carriage body, of tubular side frame members for supporting the carriage body, said members having upturned rear extremities, a hollow handle-bar connecting said upturned extremities and having a winding drum rotatable therein, a brake for engaging one of the wheels, brake-actuating mechanism, a cable connecting said brake actuating mechanism with said winding drum said cable extending through one of said tubular frame members and adapted to be wound on the drum as it is turned in one direction to apply the brake to the wheel and unwound from said drum as it is turned in the opposite direction to effect the release of the brake, and means forming a part of said handle bar for holding the winding drum in any position into which it may be turned.

In testimony whereof I have affixed my signature.

GEORGE W. CLARK.